(12) United States Patent
Hoymann et al.

(10) Patent No.: US 8,768,365 B2
(45) Date of Patent: Jul. 1, 2014

(54) METHOD AND ARRANGEMENT TO CONTROL A REPEATER IN A WIRELESS COMMUNICATION SYSTEM

(75) Inventors: Christian Hoymann, Aachen (DE); Magnus Almgren, Sollentuna (SE); Arne Simonsson, Gammelstad (SE); Per Skillermark, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 40 days.

(21) Appl. No.: 13/120,484

(22) PCT Filed: Sep. 24, 2008

(86) PCT No.: PCT/EP2008/062724
§ 371 (c)(1), (2), (4) Date: Mar. 23, 2011

(87) PCT Pub. No.: WO2010/034341
PCT Pub. Date: Apr. 1, 2010

(65) Prior Publication Data
US 2011/0256877 A1    Oct. 20, 2011

(51) Int. Cl.
*H04W 40/00* (2009.01)

(52) U.S. Cl.
USPC ........... 455/445; 370/274; 370/315; 370/501; 455/7; 455/11.1

(58) Field of Classification Search
USPC ............. 455/11.1, 405, 407, 408, 415, 422.1, 455/424, 425, 456.5, 456.6, 411, 432.1, 455/435.1, 436; 370/231, 235, 243–246, 370/274, 279, 315, 331, 355, 356, 492, 501
See application file for complete search history.

(56) References Cited

U.S. PATENT DOCUMENTS

| | | | |
|---|---|---|---|
| 2003/0179721 A1 | 9/2003 | Shurmantine et al. | |
| 2004/0240417 A1* | 12/2004 | Kim | 370/338 |
| 2006/0205341 A1* | 9/2006 | Runyon | 455/11.1 |
| 2007/0015462 A1* | 1/2007 | Dean et al. | 455/15 |
| 2008/0095038 A1 | 4/2008 | Chang et al. | |
| 2008/0219203 A1 | 9/2008 | Chou et al. | |
| 2009/0016290 A1* | 1/2009 | Chion et al. | 370/329 |
| 2009/0147731 A1* | 6/2009 | Chion et al. | 370/328 |

FOREIGN PATENT DOCUMENTS

| | | |
|---|---|---|
| JP | 2008104195 A | 5/2008 |
| WO | 02/41511 A1 | 5/2002 |

OTHER PUBLICATIONS

Wikipedia, The Free Encyclopedia, "Layer 2 Tunneling Protocol", Online Article, Sep. 14, 2008, [Retrieved on Apr. 2, 2013], Retrieved from Internet: http://en.wikipedia.org/w/index.php?title=Layer_2_Tunneling_Protocol&oldid=238351135.

\* cited by examiner

*Primary Examiner* — Dinh P Nguyen
(74) *Attorney, Agent, or Firm* — Coats & Bennett, P.L.L.C.

(57) ABSTRACT

An object of the present invention is to provide a mechanism for controlling a repeater that is less costly and more flexible. The objective is achieved by a method in a control unit (150) for controlling a repeater (100) being comprised in a radio access network (110). The control unit sends a repeater control message to the repeater (100). The repeater control message is tunneled as ordinary data communication via an available radio communication channel (160) within the radio access network (110). The repeater control message is configured to control the repeater (100).

27 Claims, 3 Drawing Sheets

METHOD AND ARRANGEMENT TO CONTROL A REPEATER IN A WIRELESS COMMUNICATION SYSTEM

TECHNICAL FIELD

The present invention relates to a method and an arrangement in a control unit and a method and an arrangement in a repeater. In particular, it relates to controlling the repeater by means of repeater control messages.

BACKGROUND

Repeaters are widely used in wireless communication systems in order to re-amplify electromagnetic signals between e.g. a base station and a user equipment (UE) connected to a radio access network. Repeaters receive, amplify and retransmit signals of a particular channel. Being amplified, the signal can propagate over longer distances or it provides better quality, i.e., better signal to noise and interference ratio than the original signal. Repeaters are also known as layer-1 relay.

In the wireless communication systems Long Term Evolution (LTE) Advanced both relays (both layer-2 and layer-3) and repeaters may be introduced. Repeaters are preferred by some, since they do not introduce delay and are considered less costly.

It is sometimes desired to control the repeater from other nodes, e.g. from the eNodeB being the base station in LTE. The control is desired for example to turn amplification on and off frequency selectively.

In the evolution of LTE, it is expected that a control channel is standardized to control the repeater according to nodeB scheduling, turning on and off the repeater possibly frequency selective.

A Time Division Duplex (TDD) repeater being controlled by a nodeB scheduler is described in US 2007/0015462. In this document the repeater is associated with functionality similar to that associated with the user terminal; and wherein the functionality is used to receive the communications schedule.

To introduce a control protocol for the repeater that supports all desired control and surveillance increases the complexity of the standard.

Even if a control channel is introduced in standard it will probably not include all the desired functionalities for all vendors. Big companies can probably get their solutions into the standard while smaller companies with less influence in Third Generation Partnership Project (3GPP) will not. 3GPP is the name given to a project within the Third Generation Partnership Project to improve the 3G Mobile System to cope with future technology evolutions.

Also, in the standardization, a focus on the scheduling will be highly prioritized. There are other operation and control messages that will not be included in the standard, at least not in the first releases.

A control protocol may further require higher layer (layer-2?) capabilities which increase the complexity and cost of the repeater. US 2007/0015462 does not describe how the communication link between the scheduling node and the repeater shall be realized.

US 2008/219203 depicts a tunneling system which is used to overcome deficiencies of legacy frame structure. In this document, a base station sends data to mobile subscribers via repeaters. The data is sent in a tunnel packet mode in a first tunnel domain through relay stations to a relay station at the boundary of the first tunnel domain. The boundary relay station then translates the data from tunnel packet mode to legacy frame format in order to cross the from a first tunnel domain into a second tunnel domain. After receiving the data a relay station in the second tunnel domain translates the data back to tunnel packet mode for tunneling via relay stations to the mobile subscriber. In this way tunneling can be achieved with distributed control where the legacy mode must be used to send data among different tunnel domains. US 2008/219203 discloses a method for controlling data to be sent from a base station via relay stations to mobile subscribers. The control data is used to identify if a data frame is a tunnel burst mode frame or a legacy frame, to see if the if a translation from a tunnel burst mode to a legacy mode is required.

US200/3179721 discloses repeater messages such as feedback from the repeater to the "master" and repeater configuration messages sent from the master to the repeater. The configuration relates to enable or disable specific repeater functions, set timing parameters, signal thresholds, etc, i.e. to control the repeater. The configuration message is transmitted from the master as broadcast message addressing all repeaters, an individual repeater or a specific type of repeaters.

SUMMARY

An object of the present invention is to provide a mechanism for a flexible control of a repeater.

According to a first aspect of the present invention, the object is achieved by a method in a control unit for controlling a repeater being comprised in a radio access network. The control unit sends a repeater control message to the repeater. The repeater control message is tunneled as ordinary data communication via an available radio communication channel within the radio access network. The repeater is controlled by means of the control message.

According to a second aspect of the present invention, the object is achieved by a method in a repeater for being controlled by a control unit. The repeater is comprised in a radio access network. The repeater receives a repeater control message from the control unit. The repeater control message is tunneled as ordinary data communication via an available radio communication channel within the radio access network. The repeater is controlled by the control unit by means of the repeater control message.

According to a third aspect of the present invention, the object is achieved by an arrangement in a control unit for controlling a repeater by means of repeater control messages, the repeater is comprised in a radio access network. The control unit arrangement comprises a transceiver unit configured to send a repeater control message to the repeater. The repeater control message is tunneled as ordinary data communication via an available radio communication channel within the radio access network.

According to a fourth aspect of the present invention, the object is achieved by an arrangement in a repeater or relay "repeater". The repeater is comprised in a radio access network. The repeater arrangement comprises a transceiver unit configured to receive a repeater control message from a control unit. The repeater control message is tunneled as ordinary data communication via an available radio communication channel within the radio access network. The repeater is controlled by the control unit by means of the repeater control message.

Since the repeater control message is tunneled, the repeater can be controlled without being the control mechanism being adopted by any wireless communication standard, implying a more flexible mechanism for controlling a repeater.

An advantage of the present invention is that proprietary repeater control is enabled. This may be used by e.g. vendors that fail to get their desired solution into the standard or used for early deployment of solutions before enabled by the standard.

Another advantage is that when applying the invention in systems with no support of repeater control, the present invention provides a means to control the repeaters.

A further advantage of the present invention is that a simplified standardization by less proprietary solutions and compromises is enabled.

A further advantage of the present invention is that it enables third party control of repeaters and relays.

BRIEF DESCRIPTION OF THE DRAWINGS

The invention is described in more detail with reference to attached drawings illustrating exemplary embodiments of the invention and in which.

DETAILED DESCRIPTION

Briefly described, the present solution involves repeater control messages being tunneled as ordinary data communication e.g. through an available data channel. No standardization is required for sending and receiving the repeater control messages, and proprietary repeater control is enabled. According to some embodiments a repeater is combined with a user equipment (UE) that tunnels control messages to/from the repeater through a data channel in the radio access network from/to the desired control unit, for example a nodeB.

Figure 1:
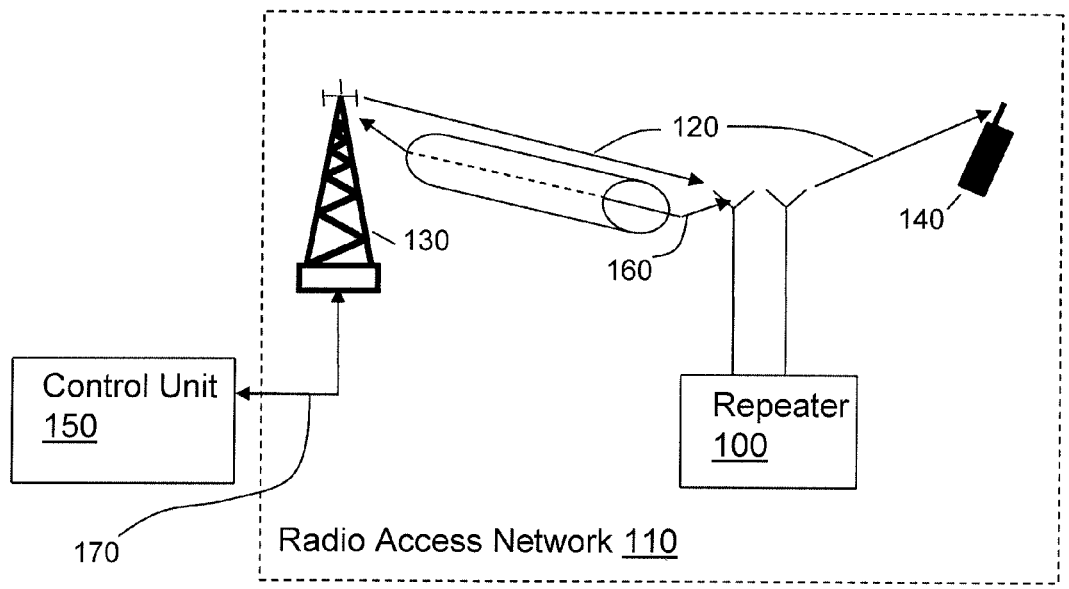
FIG. 1 is a schematic block diagram illustrating embodiments of a wireless communication network.

FIG. 1 depicts a repeater or a relay, from now on called the repeater 100. The repeater 100 is comprised in a radio access network 110 using technologies such as Long Term Evolution (LTE), LTE-advanced, Evolved Universal Terrestrial Radio Access (S-UTRA), UTRA, Worldwide Interoperability for Microwave Access (WiMax). The repeater 100 is adapted to receive, amplify and retransmit signals of a particular radio communication channel 120, such as e.g. a radio channel between a base station 130 and a user equipment (UE) such as a mobile phone 140.

A control unit 150 controls the repeater 100. The repeater 100 is controlled by means of repeater control messages sent between the control unit 150 and the repeater 100.

According to the present solution, the repeater control messages are sent tunneled as ordinary data communication through an available radio communication channel 160, between the base station 130 and the repeater 100, utilizing the radio access network 100 and/or fixed line infrastructures 170. The tunnel may be created by setting up a ordinary data communication channel (call) from the control unit 150 to the repeater 100 addressed with a SIM-card identity or a phone number of the repeater 100. The tunneling makes the radio access network 110 believe that the repeater control message is an ordinary data communication and makes the radio network 100 (at least the lower layers such as RLC) unaware that it really is a control message that is sent. This enables non-standardized repeater control and proprietary repeater control. Through the data communication channel any proprietary control message may be sent without being specified in the standard. It further enables for early deployment of solutions before enabled by the standard. It further simplifies standardization by less proprietary solutions and compromises, and enables third party control of repeaters and relays.

The control unit 150 may be comprised in the radio access network 110 (not shown). In some embodiments the control unit 150 is comprised in the radio base station 130, such as e.g. in a NodeB. In these embodiments the control unit 150 may perform scheduling control of the repeater 100. This embodiment may advantageously be used when the base station 130 and the repeater 100 is designed by the same vendor. It will be probably be less efficient than a standardized solution but enables proprietary desired solutions that are not yet implemented in the standard.

In this case the establishment of the tunnel may be created by setting up radio channels links with RLC (Radio Link Control) from the nodeB to the repeater by addressing a SIM card of the repeater, or by means of IP protocol.

Figure 2:
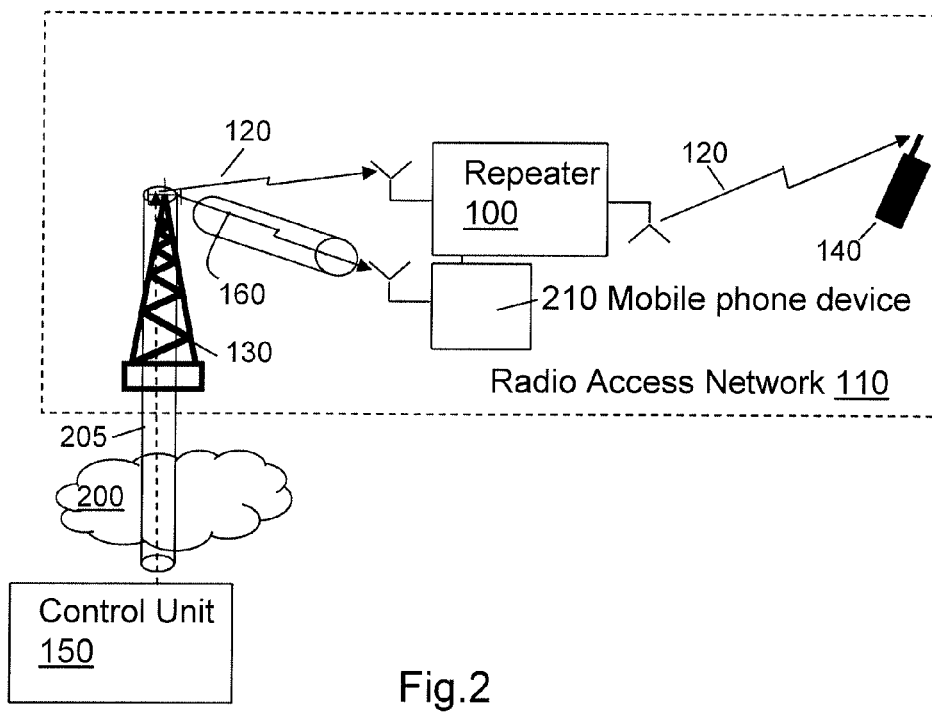
FIG. 2 is a schematic block diagram illustrating embodiments of a wireless communication network.

The control unit 150 may also reside outside of the radio access network 110 as depicted in FIGS. 1 and 2. When the control unit 150 is located outside of the radio access network 110, control messages to and from the control unit 150 may first have to pass a network 200 such as e.g. the Internet before reaching the radio access network 110, possibly through a tunnel 205 into the tunnel 160. This is depicted in FIG. 2. When the control unit 150 is resided outside the radio access network 110, the radio access network 110 may not be aware of the control unit 150, neither of the repeater 100 or any further repeaters deployed in the coverage area of the radio access network 110. This embodiment may be useful for operation and maintenance of repeaters and relays such as turning it on and off which is not as time critical and integrated with nodeB operation as scheduling. It also enables repeater control for vendors without nodeB:s and radio network products in their portfolio. In this case the tunnel can be set up by making a "data call" from the control node 150 to the repeater 100 addressing its phone number. The tunnel can also be established from the repeater to the control unit by addressing its internet address.

The repeater control may be realized by adding a mobile telephone device 210 to the radio repeater 100. This is schematically illustrated in FIG. 2, even though this embodiment also may be implemented in the embodiment illustrated in FIG. 1. The mobile telephone device 210 may be any mobile phone such as a user equipment (UE), a mobile telephone platform and a SIM or UE components etc., capable of performing control and data communication with the nodeB and data communication with the repeater 100. This enables a low cost controllable repeater by utilizing low cost mobile phone device or UE components.

The control unit 150 controls the repeater 100 by sending control messages tunneled over the communication channel 160 to the mobile telephone device 210 comprised in or being added to the repeater 100. In this embodiment, the mobile telephone device transmits and receives repeater control messages to and from the repeater 100, which repeater control messages are tunneled through the radio access network 110 via the communication channel 160, i.e., the repeater control messages are treated as any other data traffic, passing through the radio access network 100. The radio communication channel 160 is here created by adding the mobile telephone device 210 to the repeater 100, i.e. the radio communication channel 160 is created between the base station 130 and the mobile telephone device 210 associated to the repeater 100.

Figure 3:
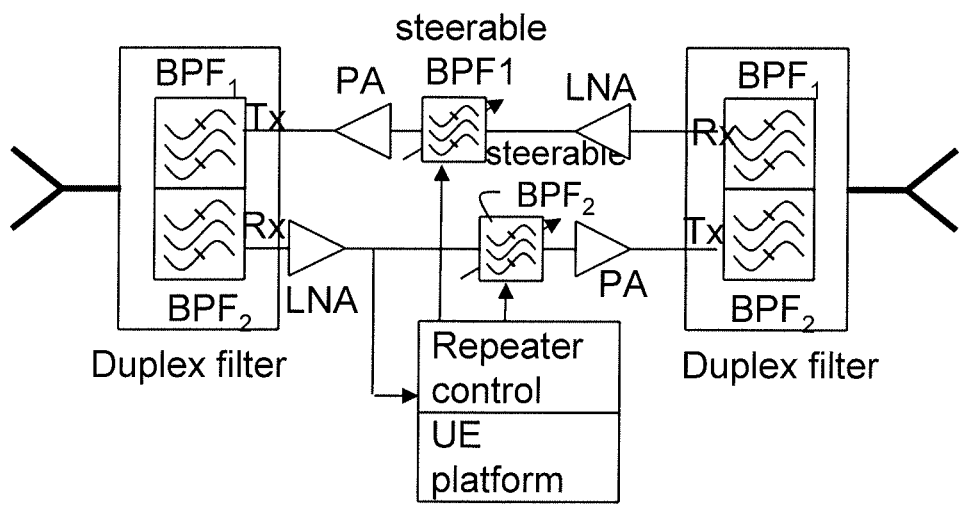
FIG. 3 is a schematic block diagram illustrating embodiments of a repeater.

The combination of the mobile telephone device 210 and the repeater 100 may be integrated in different levels, such as e.g. loose co-sited solution depicted in FIG. 2 or a mobile telephone device 210 in the repeater 100. An example is shown in FIG. 3 wherein BPF is Band Pass Filter, PA is Power Amplifier, LNA is Low Nice Amplifier and $BPF_1$ and $BPF_2$ are the band pass filter in the direction from nodeB to the UE and the other direction respectively. FIG. 3 shows only the control of frequency selective amplification where the band pass filters are controlled to only amplify the desired bands of the total bandwidth according to received control message. The scheduler in node B 5 can then control the repeater 100 to amplify only the scheduled frequency bands (resource blocks in LTE) for the mobiles in the vicinity of the repeater 100. Other parameters such as the transmission power level can be controlled in the same way. Also measurement reporting can be made similarly by letting the measurements performed by the repeater 100 being reported through the mobile telephone device 210 data channel 10 tunnel 160.

Figure 4:
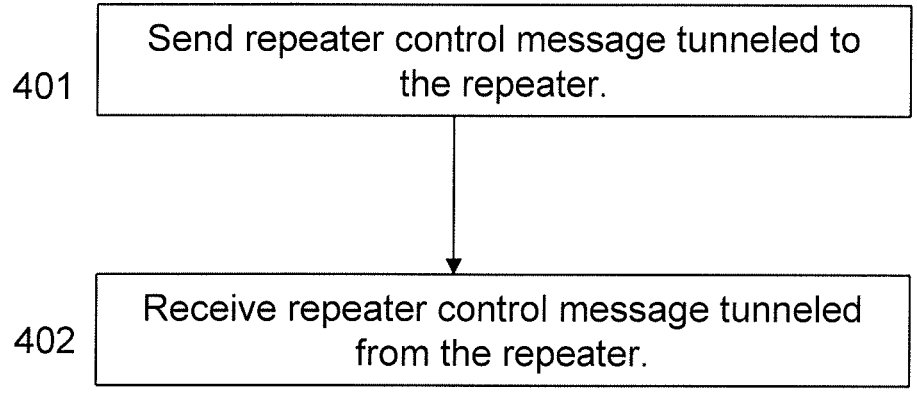
FIG. 4 is a flow chart illustrating embodiments of a method in a control unit.

The method steps in the control unit 150, for controlling the repeater, according to some embodiments will now be described with reference to a flowchart depicted in FIG. 4.

As mentioned above, the radio access network 110 may be unaware of the control unit 150. In some embodiments the control unit 150 resides outside the radio access network 110 and in some embodiments, the control unit 150 is comprised in the radio access network 110. The control unit 150 may be comprised in the radio base station 130, such as e.g. in a NodeB. As also mentioned above, the repeater 100 is comprised in the 20 radio access network 110. The method in the control unit 150 comprises the steps of:

401. A repeater control message is sent to the repeater or the relay 100 "repeater". The repeater control message is tunneled as ordinary data communication via an available radio communication channel 160 within the radio access network 110. The tunneling makes the radio network 110 believe that it is an ordinary payload, i.e. as ordinary data communication to or from a radio network node, and makes the radio network 100 unaware that it really is a control message that is sent. The repeater control message is configured to control the repeater 100.

The tunnel may be established by addressing a SIM card, a mobile phone number or an Internet protocol "IP" address of the repeater 100.

In some embodiments, the repeater control message is adapted to perform scheduling control of the repeater 100.

The repeater control message may further be adapted to turn the repeater 100 on and/or off, or to control the transmission power level of the repeater 100.

In some embodiments the control unit 150 resides outside the radio access network 110. In this case this step is performed via a data communication network such as e.g. the Internet, connected to the radio access network 110, in which radio access network 110 the repeater control message is sent or received tunneled as ordinary data communication.

402. This step is optional. A repeater control message is received from the repeater 100. The repeater control message is tunneled as ordinary data communication via an available radio communication channel 160 within the radio access network 110. As in step 401, the tunneling makes the radio network 100 believe that it is an ordinary data communication and makes the radio network 110 unaware that it really is a control message that is sent. The tunnel may be initiated and established by the repeater 100, by addressing the internet address of the control node 150.

In some embodiments the repeater control message comprises feedback from the repeater 100. The repeater control message may e.g. comprise a measurement report such as a report of measured interference power in up-link and downlink.

Also in some embodiments of this step, the control unit 150 may reside outside the radio access network 110. In this case this step is performed via a data communication network such as e.g. the Internet, connected to the radio access network 110, in which radio access network 110 the repeater control message is sent or received tunneled as ordinary data communication.

Figure 5:
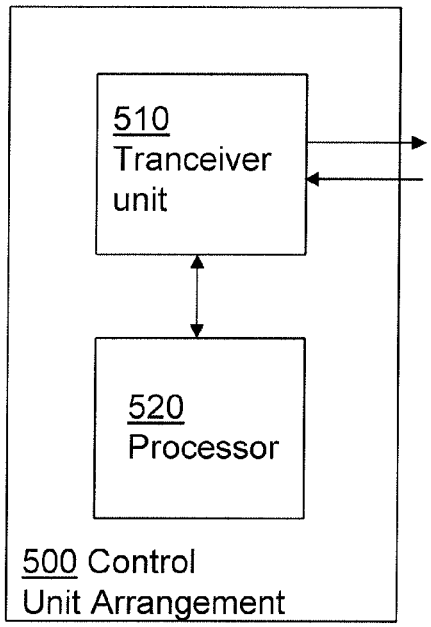
FIG. 5 is a schematic block diagram illustrating embodiments of a control unit arrangement.

To perform the method steps above, the control unit 150 comprises an arrangement 500 depicted in FIG. 5. The arrangement may be regarded as an apparatus.

As mentioned above, the control unit 150 may be comprised in the radio access network 110. In some embodiments, the control unit 150 is comprised in the radio base station 130, such as e.g. a NodeB.

The control unit 150 may reside outside the radio access network 110. In that case the transceiver unit 510 may further be configured to send or receive a repeater control message via a data communication network such as e.g. the Internet, connected to the radio access network 110 in which radio access network 110 the repeater control message is sent or received tunneled as ordinary data communication.

The radio access network 110 may be unaware of the control unit 150.

As also mentioned above, the repeater 100 is comprised in a radio access network 110.

The control unit arrangement 500 comprises a transceiver unit 510 configured to send to the repeater 100, a repeater control message. The repeater control message is tunneled as ordinary data communication via an available radio communication channel 160 within the radio access network 110. The repeater control message is configured to control the repeater 100. The tunnel may be established by addressing a SIM card, a mobile phone number or an Internet protocol "IP" address of the repeater 100.

The repeater control message may be adapted to perform scheduling control of the repeater 100, may be adapted to turn the repeater 100 on and/or off, or to control the transmission power level of the repeater 100, etc.

In some embodiments the transceiver unit 510 is further adapted to receive from the repeater 100, a repeater control message, the repeater control message being tunneled as ordinary data communication via an available radio communication channel (160) within the radio access network (110). The repeater control message may e.g. comprise a measurement report such as a report of measured interference power in up-link and downlink.

Figure 6:
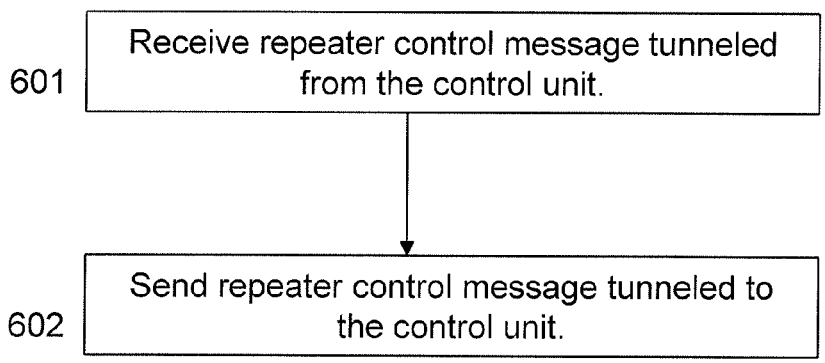
FIG. 6 is a flow chart illustrating embodiments of a method in a repeater.

The method steps in the repeater or relay 100 "repeater" for being controlled by a control unit 150 according to some embodiments will now be described with reference to a flowchart depicted in FIG. 6.

As mentioned above, the repeater 100 is comprised in the radio access network. The radio access network 110 may be unaware of the repeater 100.

The method in the repeater 100 comprises the steps of:

601. The repeater 100 receives a repeater control message from the control unit 150. The repeater control message is tunneled as ordinary data communication via an available radio communication channel within the radio access network 110.

The repeater control message may be adapted to perform scheduling control control the transmission power level of the repeater 100. The repeater 100 being controlled by the control unit by means of the repeater control message.

602. In this step the repeater 100 sends a repeater control message to the control unit 150. The repeater control message is tunneled as ordinary data communication via an available radio communication channel within the radio access network 110.

In some embodiments, the repeater control comprises feedback from the repeater 100. The repeater control message may e.g. comprise a measurement report such as a report of interference power measured in up-link and downlink, such as signal strength or quality of received signal from nodeB or mobile device. It can also be other feedback such as access attempts or location update messages from mobiles.

In some embodiments, the repeater 100 comprises a mobile telephone device 210. The mobile telephone device 210 may be used for the step of sending 601 and receiving 602 the tunneled repeater control message. The mobile telephone device 210 may e.g. be represented by a mobile telephone platform or a user equipment. The tunnel may be established by the control node by addressing a SIM card, a mobile phone number or an Internet protocol "IP" address of the repeater 100.

Figure 7:
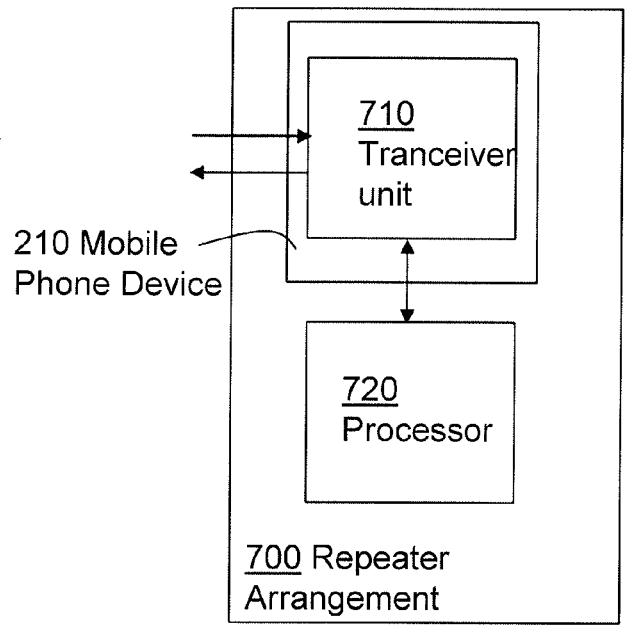
FIG. 7 is a schematic block diagram illustrating embodiments of a repeater arrangement.

To perform the method steps above for being controlled by a control unit 150, the repeater or relay 100 "repeater"comprises an arrangement 700 depicted in FIG. 7. The arrangement shall be understood as an apparatus. As mentioned above, the repeater 100 is comprised in a radio access network 110. The radio access network 110 is unaware of the repeater 100.

The repeater arrangement 700 comprises a transceiver unit 710 configured to receive from the control unit 150, a repeater control message. The repeater control message is tunneled as ordinary data communication via an available radio communication channel within the radio access network 110. The repeater 100 is controlled by the control unit by means of the repeater control message. E.g., the repeater control message may be adapted to perform scheduling control of the repeater 100 or adapted to turn the repeater 100 on and/or off, or to control the transmission power level of the repeater 100.

In some embodiments the transceiver unit is further configured send to the control unit, a repeater control message, the repeater control message being tunneled as ordinary data communication via an available radio communication channel within the radio access network. The repeater control message may comprise feedback from the repeater 100, e.g. it may comprise a measurement report such as a report of interference power measured in up-link and downlink.

In some embodiments, the repeater 100 comprises the mobile telephone device 210, which mobile telephone device 210 is configured to be used for send or receive the tunneled repeater control message.

The mobile telephone device 210 may e.g. be represented by a mobile telephone platform or a user equipment.

The tunnel may be established by the control node, by addressing a SIM card, a mobile phone number or an Internet protocol "IP" address of the repeater 100.

The present mechanism for controlling the repeater 100, and the present mechanism for being controlled by a control unit 150, may be implemented through one or more processors, such as a processor 520 in the control unit arrangement 500 depicted in FIG. 5 or the processor 720 in the repeater arrangement 700 depicted in FIG. 7, together with computer program code for performing the functions of the present solution. The program code mentioned above may also be provided as a computer program product, for instance in the form of a data carrier carrying computer program code for performing the present solution when being loaded into the control unit 150 or the repeater 110. One such carrier may be in the form of a CD ROM disc. It is however feasible with other data carriers such as a memory stick. The computer program code can furthermore be provided as pure program code on a server and downloaded to control unit 150 or the repeater 110 remotely.

The term uplink means the communication from a user equipment to a base station and the term downlink means the communication from a base station to a user equipment.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method implemented by a control unit for controlling a relay or repeater ("repeater") that retransmits signals between a base station and a user equipment in a radio access network, the method comprising:

sending a repeater control message to the repeater through a tunnel as ordinary data from the perspective of the radio access network, said tunnel created by setting up an available data communication channel from the base station to the repeater and by addressing a SIM (Subscriber Identity Module) card, a mobile phone number, or an Internet protocol (IP) address of the repeater, the repeater control message configured to control the repeater;

wherein the base station and the repeater are endpoints of the tunnel;

wherein the control unit resides outside the radio access network;

wherein said sending comprise sending the repeater control message via a data communication network connected to the radio access network; and wherein the tunnel is a first tunnel, and the control unit communicates with the first tunnel via a second tunnel that passes through the data communication network.

2. The method according to claim 1, wherein the repeater control message is configured to control scheduling of the repeater.

3. The method according to claim 1, wherein the repeater control message is configured to turn the repeater on or off.

4. The method according to claim 1, wherein the repeater control message is configured to control the transmission power level of the repeater.

5. The method according to claim 1, further comprising receiving a second repeater control message from the repeater through a second tunnel as ordinary data from the perspective of the radio access network, said second tunnel created by setting up another available data communication channel within the radio access network.

6. The method according to claim 5, wherein the second repeater control message comprises feedback from the repeater.

7. The method according to claim 5, wherein the second repeater control message comprises a measurement report.

8. The method according to claim 1, wherein the radio access network is unaware of the control unit.

9. A method implemented by a relay or repeater ("repeater") that retransmits signals between a base station and a user equipment in a radio access network, for being controlled by a control unit, the method comprising:
receiving a repeater control message from the control unit through a tunnel as ordinary data from the perspective of the radio access network, said tunnel created by setting up an available data communication channel from the base station to the repeater and by addressing a SIM (Subscriber Identity Module) card, a mobile phone number, or an Internet protocol (IP) address of the repeater; and
controlling the repeater according to the received repeater control message;
wherein the base station and the repeater are endpoints of the tunnel;
wherein the control unit resides outside the radio access network;
wherein said receiving comprises receiving the repeater control message via a data communication network connected to the radio access network; and
wherein the tunnel is a first tunnel, and the control unit communicates with the first tunnel via a second tunnel that passes through the data communication network.

10. The method according to claim 9, wherein the repeater comprises a mobile telephone device configured to receive the repeater control message through the tunnel.

11. The method according to claim 10, wherein the mobile telephone device comprises a mobile telephone platform.

12. The method according to claim 10, wherein the user equipment is a first user equipment, and wherein the mobile telephone device comprises an additional user equipment.

13. The method according to claim 9, wherein the repeater control message is configured to control scheduling of the repeater.

14. The method according to claim 9, wherein the repeater control message is configured to turn the repeater on or off, or to control the transmission power level of the repeater.

15. The method according to claim 9, further comprising sending a second repeater control message to the control unit through the second tunnel as ordinary data from the perspective of the radio access network.

16. The method according to claim 15, wherein the second repeater control message comprises feedback from the repeater.

17. The method according to claim 15, wherein the second repeater control message comprises a measurement report.

18. The method according to claim 9, wherein the radio access network is unaware of the repeater.

19. A control unit for controlling a relay or repeater ("repeater") configured to retransmit signals between a base station and a user equipment in a radio access network, the control unit comprising one or more processors configured as:
a transceiver unit configured to send a repeater control message to the repeater through a tunnel as ordinary data from the perspective of the radio access network, said tunnel created by setting up an available data communication channel from the base station to the repeater and by addressing a SIM (Subscriber Identity Module) card, a mobile phone number, or an Internet protocol (IP) address of the repeater, the repeater control message configured to control the repeater;
wherein the base station and the repeater are endpoints of the tunnel;
wherein the control unit resides outside the radio access network;
wherein the transceiver unit is configured to send the repeater control message via a data communication network connected to the radio access network; and
wherein the tunnel is a first tunnel, and the control unit communicates with the first tunnel via a second tunnel that passes through the data communication network.

20. The control unit according to claim 19, wherein the transceiver unit is further is configured to receive a second repeater control message from the repeater through the second tunnel as ordinary data from the perspective of the radio access network.

21. The control unit according to claim 19, wherein the radio access network is unaware of the control unit.

22. A relay or repeater ("repeater") configured to retransmit signals between a base station and a user equipment in a radio access network, the repeater comprising:
a transceiver configured to receive a repeater control message from a control unit through a tunnel as ordinary data from the perspective of the radio access network, said tunnel created by setting up an available data communication channel from the base station to the repeater and by addressing a SIM (Subscriber Identity Module) card, a mobile phone number, or an Internet protocol (IP) address of the repeater; and
a processor configured to control the repeater according to the received repeater control message;
wherein the base station and the repeater are endpoints of the tunnel;
wherein the control unit resides outside the radio access network;
wherein the transceiver is configured to receive the repeater control message via a data communication network connected to the radio access network; and
wherein the tunnel is a first tunnel, and the control unit communicates with the first tunnel via a second tunnel that passes through the data communication network.

23. The repeater according to claim 22, wherein the transceiver is further configured send a second repeater control message to the control unit through the second tunnel as ordinary data from the perspective of the radio access network.

24. The repeater according to claim 22, further comprising a mobile telephone device configured to receive the repeater control message through the tunnel.

25. The repeater according to claim 24, wherein the mobile telephone device comprises a mobile telephone platform.

26. The repeater according to claim 24, wherein the user equipment is a first user equipment, and wherein the mobile telephone device comprises an additional-user equipment.

27. The repeater according to claim 22, wherein the radio access network is unaware of the repeater.

* * * * *

UNITED STATES PATENT AND TRADEMARK OFFICE
CERTIFICATE OF CORRECTION

PATENT NO. : 8,768,365 B2  
APPLICATION NO. : 13/120484  
DATED : July 1, 2014  
INVENTOR(S) : Hoymann et al.

It is certified that error appears in the above-identified patent and that said Letters Patent is hereby corrected as shown below:

In the Specification

In Column 2, Line 13, delete "US200/3179721" and insert -- US2003/179721 --, therefor.

In Column 3, Line 48, delete "(S-UTRA)," and insert -- (E-UTRA), --, therefor.

In Column 3, Line 61, delete "network 100" and insert -- network 110 --, therefor.

In Columns 3 & 4, Lines 67 & 1, delete "network 100" and insert -- network 110 --, therefor.

In Column 4, Line 65, delete "network 100." and insert -- network 110. --, therefor.

In Column 5, Line 14, delete "B 5 can" and insert -- B can --, therefor.

In Column 5, Line 21, delete "channel 10" and insert -- channel --, therefor.

In Column 5, Line 32, delete "the 20 radio" and insert -- the radio --, therefor.

In Column 5, Line 41, delete "network 100" and insert -- network 110 --, therefor.

In Column 7, Line 2, delete "control control" and insert -- control of the repeater 100 or be adapted to turn the repeater 100 on and/or off, or to control --, therefor.

In Column 7, Lines 45-46, delete "configured send to" and insert -- configured to send --, therefor.

In Column 8, Line 6, delete "repeater 110." and insert -- repeator 100. --, therefor.

In Column 8, Line 11, delete "repeater 110" and insert -- repeator 100 --, therefor.

Signed and Sealed this  
Thirty-first Day of March, 2015

Michelle K. Lee  
*Director of the United States Patent and Trademark Office*

CERTIFICATE OF CORRECTION (continued)
U.S. Pat. No. 8,768,365 B2

In the Claims

In Column 10, Line 16, in Claim 20, delete "further is configured" and insert -- further configured --, therefor.

In Column 10, Line 45, in Claim 23, delete "configured send" and insert -- configured to send --, therefor.

In Column 10, Line 57, in Claim 26, delete "additional-user" and insert -- additional user --, therefor.